(12) United States Patent
Hötzeldt et al.

(10) Patent No.: US 9,005,731 B2
(45) Date of Patent: Apr. 14, 2015

(54) COMPOSITE PLATE AND METHOD OF DRAINING A COMPOSITE PLATE

(75) Inventors: Stephan Hötzeldt, Bremen (DE); Oliver Schindler, Bremen (DE); Steffen Erfurth, Bremen (DE); Bernd Ohlendorf, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 1239 days.

(21) Appl. No.: 12/297,532

(22) PCT Filed: May 18, 2007

(86) PCT No.: PCT/EP2007/054812
§ 371 (c)(1),
(2), (4) Date: Feb. 2, 2009

(87) PCT Pub. No.: WO2007/135085
PCT Pub. Date: Nov. 29, 2007

(65) Prior Publication Data
US 2009/0311469 A1    Dec. 17, 2009

(30) Foreign Application Priority Data
May 18, 2006  (DE) .......................... 10 2006 023 294

(51) Int. Cl.
*B32B 3/12* (2006.01)
(52) U.S. Cl.
CPC ........................................ *B32B 3/12* (2013.01)
(58) Field of Classification Search
USPC ........... 181/290, 291, 292; 428/593, 594, 178
See application file for complete search history.

(56) References Cited

U.S. PATENT DOCUMENTS

| | | | | |
|---|---|---|---|---|
| 3,035,657 A | * | 5/1962 | Lemon | 181/290 |
| 3,948,346 A | * | 4/1976 | Schindler | 428/116 |

(Continued)

FOREIGN PATENT DOCUMENTS

| | | | | |
|---|---|---|---|---|
| AT | E 38261 B | 6/1989 | | E04B 1/66 |
| DE | 2211051 | 10/1972 | | G10K 1/10 |

(Continued)

OTHER PUBLICATIONS

International Searching Authority—European Patent Office International Search Report—International Application No. PCT/EP2007/054812, dated Aug. 22, 2007, together with the Written Opinion of the International Searching Authority, 10 pages.

(Continued)

*Primary Examiner* — Adam Krupicka
(74) *Attorney, Agent, or Firm* — Ingrassia Fisher & Lorenz, P.C.

(57) ABSTRACT

The present invention concerns a composite plate (1) comprising a first cover layer (3), a second cover layer (5), and a core layer (7) arranged between the first and the second cover layers (3, 5) and having a plurality of cells (9) which are at least partially open towards the first cover layer (3) and which are separated from each other by walls as well as a method of draining such a composite plate (1). In order to provide such a composite plate (1) in which improved resistance to ingress of liquid or formation of liquid accumulations is guaranteed in a simple and continual fashion it is proposed that a draining layer (13) is provided in the first cover layer (3), wherein the cells (9) are at least partially covered by the draining layer (13).

13 Claims, 2 Drawing Sheets

(56) References Cited

U.S. PATENT DOCUMENTS

Figure 1:
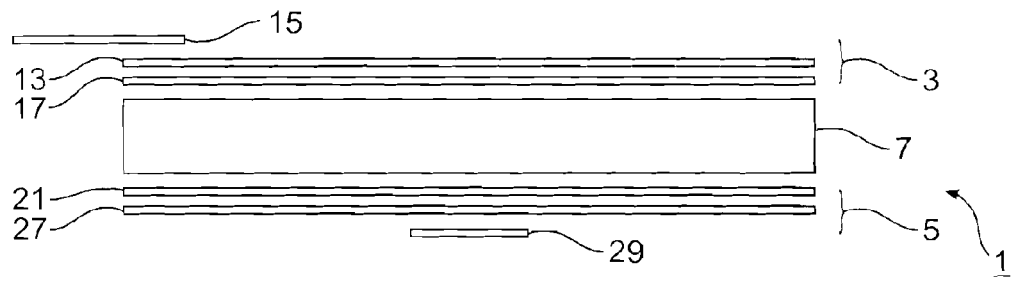

| | | | | |
|---|---|---|---|---|
| 4,294,329 A | * | 10/1981 | Rose et al. | 181/222 |
| 4,433,021 A | * | 2/1984 | Riel | 428/116 |
| 4,448,830 A | | 5/1984 | Cogliano | 428/40 |
| 4,450,192 A | | 5/1984 | Cogliano | 428/40 |
| 4,464,215 A | | 8/1984 | Cogliano | 156/71 |
| 6,607,625 B2 | * | 8/2003 | Andre et al. | 156/169 |
| 2005/0115662 A1 | * | 6/2005 | Haque et al. | 156/148 |

FOREIGN PATENT DOCUMENTS

| | | | | |
|---|---|---|---|---|
| DE | 3913255 A1 | 10/1990 | | E04F 13/08 |
| DE | 100 10 547 A1 | 9/2000 | | C08J 5/18 |
| DE | 200 16 051 U1 | 3/2002 | | B32B 3/12 |
| DE | 696 15 751 T2 | 7/2002 | | B64C 1/40 |
| EP | 0 100 231 B1 | 10/1988 | | E04B 1/66 |
| EP | 0 747 285 B1 | 12/1996 | | B64C 1/40 |
| EP | 1 457 616 A1 | 9/2004 | | E04C 2/36 |
| GB | 1 373 063 | 11/1974 | | G10K 11/00 |
| GB | 2 122 540 A | 1/1984 | | B32B 3/12 |
| JP | H02122923 A | 5/1990 | | |
| JP | H07165197 A | 6/1995 | | |
| RU | 2081267 C1 | 6/1997 | | |

OTHER PUBLICATIONS

Eisenfuhr, Speiser & Partner Response to the International Search Report and the Written Opinion of the International Searching Authority dated Oct. 31, 2007, 11 pages.
German Patent and Trademark Office, Office Action for German Application No. 102006023294.1, mailed Nov. 7, 2006.
European Patent Office, Office Action for European Application No. 07729260.5, mailed Sep. 28, 2010.
Russian Patent Office, Decision on Grant for Russian Application No. RU 2008149940/11, mailed May 20, 2011.
State Intellectual Property Office of People's Republic of China, Office Action for Chinese Application No. 200780017667.0, mailed May 31, 2011.
Japan Patent Office, Notification for Reason of Rejection for Japanese Application No. 2009-510465, mailed Mar. 5, 2012.
European Patent Office, Office Action for European Application No. 07729260.5, mailed Jan. 2, 2014.

* cited by examiner

COMPOSITE PLATE AND METHOD OF DRAINING A COMPOSITE PLATE

The present invention concerns a composite plate comprising a first cover layer, a second cover layer, and a core layer arranged between the first and the second cover layers and having a plurality of cells which are at least partially open towards the first cover layer and which are separated from each other by walls and a method of draining such a composite plate.

At the present time principally closed sandwich structures with a "honeycomb" core, for example comprising an aramid fibre material identified as Nomex® and cover layers of glass fibre prepreg and/or carbon fibre prepreg are used for cladding or lining aircraft interiors. That kind of composite plates however is completely closed off in relation to fluid in the form of liquid or gas passing thereinto or passing therethrough. It will be noted however that the lack of gas permeability entails the consideration that this kind of composite plates does not adequately fulfil acoustic demands in relation to sound damping.

Composite plates which are designed in particular in consideration of sound damping are known for example from DE 22 11 051, DE 39 13 255 A1, EP 0 747 285 B1 and DE 200 16 051 U1. Here in each case at least one cover layer has a plurality of holes or micropores, which allows at least partial gas permeability.

It will be appreciated that the openings in the cover layers also allow liquids, for example water of condensation, to penetrate into the cells or honeycombs of the core layer. The water passing thereinto can result in corrosion or rotting of the materials of the composite plate. Particularly in the case of a cyclic thaw/freeze loading situation that can have the unwanted consequence of delamination. Added to that is the fact that the entering liquid can give rise to closure of the openings, with a corresponding deterioration in the acoustic damping properties.

DE 22 11 051 proposes inter alia for the removal of liquids which have penetrated into the plate that the walls of the cells are provided with openings which adjoin the cover layers and through which the liquids can drain away. It will be noted however that those openings or slots have the disadvantage that they complicate manufacture of the composite plates and can have unpredictable effects on the damping properties of the composite plate.

Therefore an aspect of the present invention is to provide a composite plate of the kind set forth in the opening part of this specification and a method of draining such a composite plate, wherein the above-indicated disadvantages are avoided and improved resistance to ingress of liquid or formation of liquid accumulations is ensured in a simple and continual fashion.

According to the invention there is proposed a composite plate comprising a first cover layer, a second cover layer, and a core layer arranged between the first and the second cover layers and having a plurality of cells which are at least partially open towards the first cover layer and which are separated from each other by walls, in which the first cover layer has a draining layer, wherein the cells are at least partially covered by the draining layer.

In addition there is proposed a method of draining a core layer of such a composite plate comprising the steps: providing a draining layer in the first cover layer, wherein the draining layer respectively at least partially covers the opening of a cell, receiving liquid from the plurality of cells which are at least partially open towards the first cover layer and which are separated from each other by walls, by the draining layer, and removing the liquid from the draining layer and the composite plate.

The invention is based on the realisation that gas permeability which is desired for acoustic reasons can be achieved without any infiltrated liquid remaining in the cells of the composite plate or the walls of the cells having to be apertured for the discharge of infiltrated liquid if a cover layer performs a draining function. The infiltrated liquid passes from the interior of the cells, which is at least partially also delimited by the draining layer, into the draining layer in which it can be discharged from the cells and out of the core layer. If a means delimiting the cell interior has the function of receiving liquid and removing it from the cell interior, that thus continuously provides that the interior of the cells remains sufficiently dry and is thus substantially protected from the stresses caused by repeated freezing and thawing, and the risk of delamination.

In a configuration of the invention the draining layer includes a liquid-draining textile, wherein the textile is in particular hydrophilic. A woven or non-woven textile can be easily provided with pores, small openings or similar means, in respect of which the capillary forces cause liquid to be passed into the textile or between the textile fibres, which liquid can then be removed from the textile in part by evaporation and in part as a consequence of a force acting thereon, for example as a consequence of the force of gravity. Particularly in a situation involving use in an aircraft, principally in the interior of the aircraft, it is assumed here that the liquid is water, which most frequently could penetrate into the interior of the composite plate and would cause the major proportion of possible damage. It is therefore advantageous if the textile is particularly well suited for draining away water.

It is preferred if the textile is a woven textile on a polyester basis, in particular based on polyethylene terephthalate (PET). Textiles of that kind are in turn particularly resistant and can be well processed. The nature of the weaving can specifically set the mesh size and the kind of mesh, whereby it is possible to influence the liquid draining effect.

It is particularly preferred here if the textile complies with the fire-protection standards DIN 4102 Part 1/B1 and EN 1021 Part 1+2. In that way, a composite plate with that textile can be used in an aircraft without further treatment, in which respect known components which can already be employed in an aircraft can be used as further constituents of the composite plate without additional processing being necessary.

In a further configuration the draining layer has a draining fringe which extends beyond the core layer, wherein the draining fringe in particular is of a shape which narrows in a direction away from the core layer. It was found that such a draining fringe simplifies removal of a liquid received by the draining layer, from the draining layer, as can occur for example due to the action of a shearing force. For that purpose, when the composite plate is used vertically, the draining fringe should preferably be arranged at a lower end of the composite plate. When the composite plate is installed horizontally it is preferable for the draining layer to be arranged beneath the core layer, in which case then the draining fringe can additionally hang downwardly from the composite plate.

In a further advantageous configuration of the composite plate according to the invention the first cover layer further has a first through-passage layer arranged between the draining layer and the core layer, wherein the first through-passage layer is provided with openings at least partially covered by the draining layer. It was found that a desired drainage of liquid out of the core layer can also be achieved when there is arranged between the draining layer and the core layer a first through-passage layer which for example can contribute to the desired stability of the composite plate, when that first through-passage layer is provided with openings, so that the draining layer adjoins the interior of the cells of the core layer through those openings, in which case the liquid to be drained away can pass through the openings in the first through-passage layer. Although it is preferable for the core layer to be connected to the first through-passage layer for reasons of ease of manufacture, in which case the draining layer is arranged on that first through-passage layer, it is also possible in accordance with the invention to provide an alternative or additional layer in such a way that the draining layer is arranged between that alternative or additional layer and the core layer.

In another configuration of the composite plate according to the invention the second cover layer has a second through-passage layer with openings, wherein the plurality of the cells in addition are respectively at least partially open to the second cover layer in the region of the openings in the second through-passage layer, wherein a through-passage path is provided for a gas through the second cover layer, the core layer and the first cover layer and/or in the reverse direction. If the composite plate is provided with passages or openings which respectively pass through the entire composite plate from one cover layer to the other, a gas, here in particular air, can pass through those openings or passages, thereby affording advantageous acoustic properties for the composite plate.

In a preferred configuration of the composite plate according to the invention the first or second cover layer has an electrically conductive layer, the electrically conductive layer having in particular an electrically conductive fabric. With the electrically conductive layer the composite plate is suitable for screening electrical or electromagnetic fields. The electrically conductive layer can also be identical to the second through-passage layer.

In that respect it is preferred if the electrically conductive layer is provided with an electrically conductive contact element which projects beyond the electrically conductive layer and is contactable with an electrically conductive layer of a further composite plate. In that way, various composite plates can be already brought into electrical contact with each other upon installation in a quick and simple fashion, in which respect it is possible to dispense with additional connecting elements or the additional mounting thereof.

Preferably the composite plate according to the invention is used as a cladding in the interior of an aircraft in such a fashion that the draining layer is disposed on the inside. The composite plate can be used substantially vertically as a wall cladding or substantially horizontally as a ceiling cladding.

Preferably the walls which separate the cells of the core layer from each other extend substantially transversely with respect to the core layer, that is to say transversely with respect to the direction of longitudinal extent of the core layer or transversely relative to the surface of the core layer in order thereby, besides adequate stability, to provide that the liquid which is to be drained away is drained away in relation to the draining layer. It is however not absolutely necessary for the walls to extend exactly transversely with respect to the surface of the core layer, but they can also extend inclinedly relative thereto, in which respect the inclination can be set and can be different depending on the respective location and purpose of use.

Figure 2:
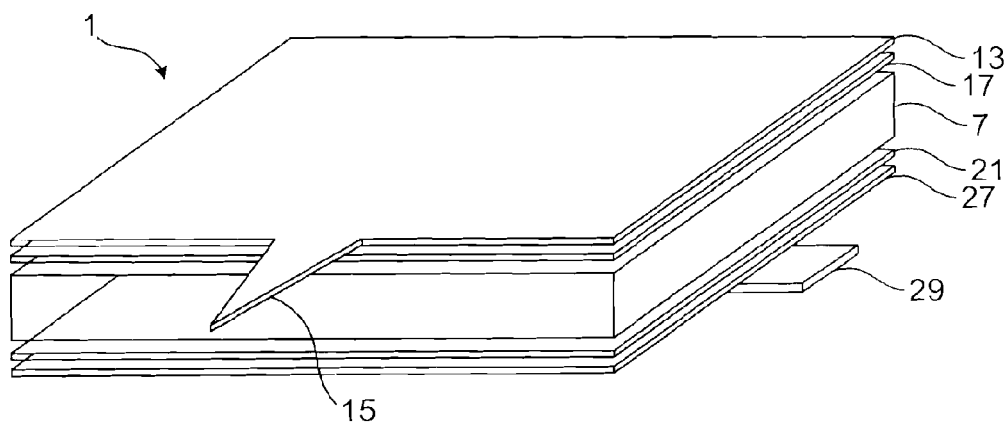
Figure 3:
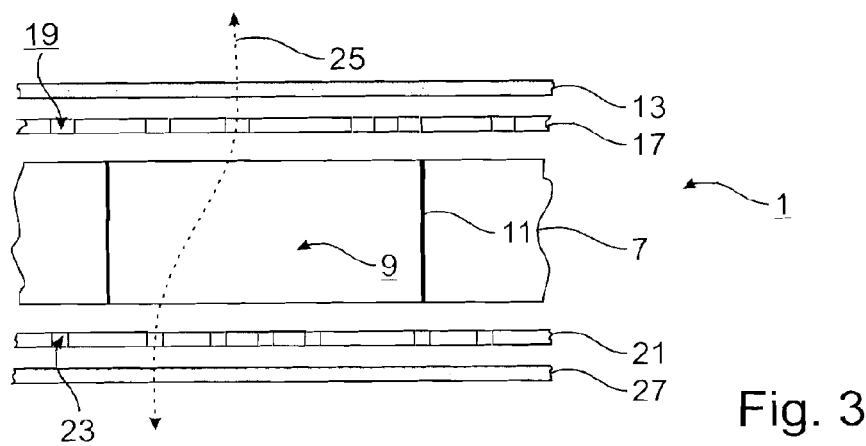
Figure 4:
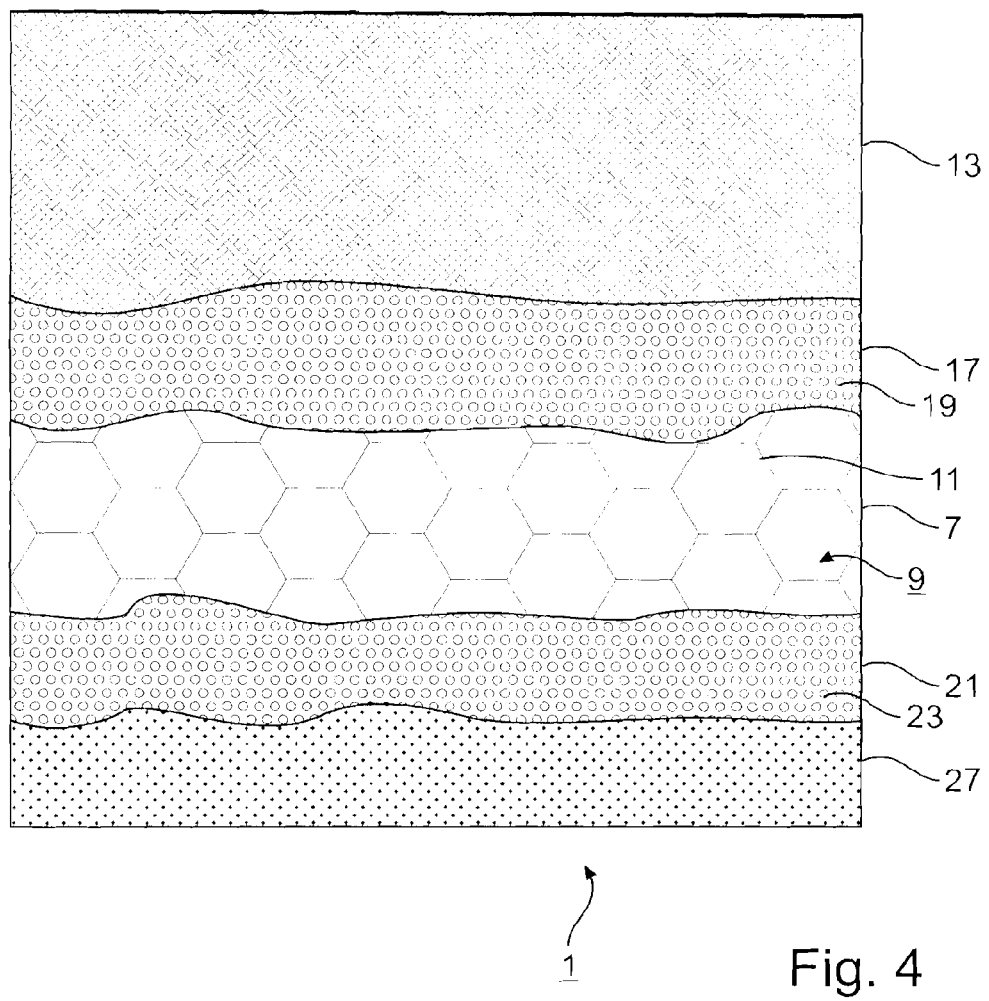
Figure 5:
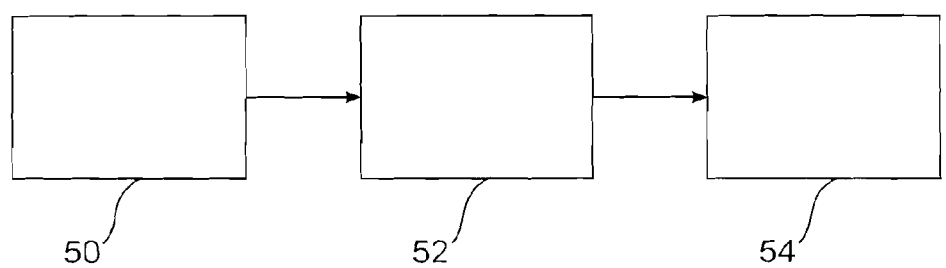

Preferred configurations of the invention are described in greater detail with reference to the accompanying Figures in which:

FIG. 1 shows a diagrammatic exploded cross-sectional view of a first composite plate according to the invention, FIG. 2 shows a diagrammatic exploded perspective view of a second composite plate according to the invention, FIG. 3 shows a diagrammatic exploded cross-sectional view of the first or second composite plate according to the invention shown in FIG. 1 and FIG. 2 respectively on an enlarged scale, FIG. 4 shows a diagrammatic elevational view onto a third composite plate according to the invention, and FIG. 5 shows a schematic flow chart illustrating the procedure of a method according to the invention.

Mutually corresponding elements in different embodiments are denoted by mutually corresponding references. The orientation of the view serves for illustration and is not deemed to be limiting.

FIG. 1 shows a diagrammatic cross-sectional view in the exploded state of a first composite plate or panel 1 according to the invention. The composite plate has a first cover layer 3 and a second cover layer 5, between which a core layer 7 is arranged. The core layer 7 includes a plurality of cells (not shown) which extend transversely with respect to the core layer 7 and which are each open towards the first and second cover layer 3, 5. The cells are described in greater detail hereinafter. The first cover layer 3 includes a draining layer 13, a draining fringe 15 and a first through-passage layer 17. The first through-passage layer 17 is disposed between the draining layer 13 and the core layer 7. The draining fringe 15 is disposed on the side of the draining layer 13, which is in opposite relationship to the first through-passage layer 17. The draining fringe 15 extends over a part of the surface of the draining layer 13 and also extends beyond the draining layer 13. The second cover layer 5 includes a second through-passage layer 21, an electrically conductive layer 27 and a contact element 29. The second through-passage layer 21 is disposed between the electrically conductive layer 27 and the core layer 7. The contact element 29 is arranged on the opposite side of the electrically conductive layer 27.

The draining layer 13 which is advantageously used here includes a hydrophilic fabric which for example is commercially available under the name Trevira CS®. The fabric comprises 100% polyethylene terephthalate (PET), it is flame-resistant, it is of a weight in relation to surface area of about 150 g/m$^2$ and it is of a thickness of about 0.5 mm in the dry condition. The draining layer 13 is quick-drying in air, tear-resistant, washing-resistant, abrasion-resistant, difficult to burn and does not support any fungal growth. In addition the fabric of the draining layer 13 is thermally weldable and has a low flow resistance of in the region around 100 Ns/m$^3$. That affords advantageous fluid permeability.

A respective corresponding draining layer 13 is used in the further embodiments described with reference to the Figures. It is however also possible to use other draining layers in other configurations and embodiments of the invention. In that respect inter alia material, dimensions and structure of the draining layer can be altered.

In the preferred configuration the draining layer 13 is of a hydrophilic nature in order to remove water as unwanted liquid which has penetrated into the composite plate 1, from the cells. As an alternative thereto it is also possible to use an oleophilic draining layer in order in specific areas of use to drain infiltrated oils.

The first and second through-passage layers 17, 21 and the core layer 7 can contain non-metallic and/or metallic materials, independently of each other. Examples of preferred non-metallic materials are glass prepreg, carbon prepreg or plastic material. Examples of preferred metallic materials are steel, titanium and aluminium.

Preferably the various layers are joined to afford the composite plate according to the invention by a baking operation (for example in an autoclave) and/or a gluing operation, for example by means of copolyamides. Alternatively or in addition it is also possible to use known possible ways of making the join. The gluing operation can be effected hot or cold. Welding, for example in the form of ultrasonic welding and/or spot welding, is also a possibility. It is also possible to use different methods of joining different elements of the composite plate. If separate elements are provided as the contact element 29 and/or the draining fringe 15, they can also be fixed in such a fashion to the draining layer 13 or the electrically conductive layer 27 respectively. In addition it is also possible to use—per se known—joining or connecting elements for that purpose.

The electrically conductive layer 27 serves to shield electromagnetic fields corresponding to the mode of operation of a Faraday cage. In order to be able to do that effectively for for example a cabin lining comprising a plurality of composite plates according to the invention, the electrically conductive layers of adjacent composite plates must be contactable with each other. That can be effected in a simple fashion by a contact element 29 which is in electrical contact with the electrically conductive layer 27, which projects beyond the edge of the composite plate and which is electrically contactable with the electrically conductive layer of an adjacently arranged, further composite plate. It can also be provided that an electrical connection can be made by means of the contact element 29 between the electrically conductive layer 27 of the composite plate 1 and the support structure of an aircraft, in which the composite plate is used.

FIG. 2 shows a diagrammatic perspective view in the exploded condition of a second composite plate 1 according to the invention. The composite plate 1 substantially corresponds to that shown in FIG. 1. The composite plate 1 of FIG. 2 differs in substance from the composite plate of FIG. 1 in that the draining fringe 15 is not provided in the form of a separate element but is integrally connected to the draining layer 13. The draining fringe 15 represents a continuation of the draining layer 13 beyond the actual composite plate 1 or the core layer 7 respectively. Water which has drained out of the interior of the cells of the core layer 7, in this example water, moves through the draining layer 13 for example as a consequence of the force of gravity. When that liquid now passes into the draining fringe 15 which in a vertically installed condition is disposed at the lower end of the composite plate 1 and when the composite plate 1 is installed horizontally hangs down from the composite plate 1, the capillary force which is operative in the draining layer is overcome by the force of gravity at the outer end of the draining fringe 15 and a drop is formed, which can drip off. That is advantageously promoted by the draining fringe 15 tapering to a point at its outer end.

FIG. 3 shows an enlarged diagrammatic cross-sectional view in the exploded condition of the first or second composite plate 1 according to the invention as shown in FIG. 1 or FIG. 2 respectively. As already described hereinbefore the core layer 7 of the composite plate 1 is enclosed by the first and the second through-passage layers 17, 21. Disposed on the respective side thereof which is opposite to the core layer 7 is the draining layer 13 and the electrically conductive layer 27 respectively, which in each case is in the form of a fabric.

The core layer 7 includes a plurality of cells 9 with walls 11. The cells 9 extend transversely through the core layer 7 and are each open towards the first and second through-passage layers 17, 23 respectively. In the embodiment illustrated here the cells 9 are defined by walls 11 in the longitudinal direction of the core layer 7, which extend in a straight line transversely through the core layer 7.

The invention however is not limited to this example. Other configurations are also possible insofar as it is ensured in that respect that the interior or liquid contained in the interior of the cells 9 can come into contact with the draining layer 13. The core layer or the core layer with the through-passage layers can correspond to a known honeycomb sandwich structure with normal or slotted (single/double) honeycomb core (expanded/under-expanded/over-expanded) with cover surfaces, wherein the cover surface or through-passage layer, between the core (layer) and the draining layer, is provided with openings through which the liquid can pass. Such a cover surface could be for example perforated.

If it is desired for for example acoustic reasons to ensure that there is a fluid through-flow path through the composite plate 1, the other cover surface or the second through-passage layer 21 is then also to be provided with openings which at least partially coincide with openings of the cells 9 of the core layer 7 towards the second through-passage layer 21.

In FIG. 2 the first through-passage layer 17 has openings 19 through which gas and liquid, preferably water, can pass from the interior of the cells 9 into the draining layer 13 in order there to be carried away. In addition the second through-passage layer 21 has openings 23 through which a gas, for example air, can pass into the cells 9 or can pass out of the cells 9. The openings 23 in the second through-passage layer 21 are smaller than those in the first through-passage layer 17. That can provide that less or no liquid at all passes through the second through-passage layer 21 and the liquid in the cells 9 is controlledly carried away on the intended path by way of the draining layer 13. That provides that a through-passage path 25 is admittedly passed through the composite plate 1 for gas, in particular air, but not for liquid, in particular water.

FIG. 3 shows the openings 19 of the first through-passage layer 17 or the openings 23 of the second through-passage layer 21, as each being of the same size. In that case the spacings of the openings 19, 23 relative to each other in each case are irregular. It will be noted however that the size of the openings can also vary within a layer. It is likewise possible for the spacings between the openings in one or both layers to be regular or uniform.

FIG. 4 shows a diagrammatic elevational view of a third composite plate 1 according to the invention. The composite plate 1 of FIG. 4 differs from those shown in FIGS. 1 and 2 in that it has neither a draining fringe nor a contact element. The composite plate 1 includes an electrically conductive fabric 27. Arranged on that electrically conductive fabric 27 is a second through-passage layer 21 with openings 23 of the same size at equal spacings. Disposed over that second through-passage layer 21 is the core layer 7 with honeycomb cells 9 which are respectively delimited from adjacent cells by walls 11. A first through-passage layer 17 with openings 19 of equal size which are also uniformly arranged is disposed on that core layer 7. The composite plate 1 is closed off by a draining fabric 13 which is disposed over the first through-passage layer 17 and which is in contact through the openings 19 with the interior of the cells 9 in order to receive liquid from there and to transport it away.

The invention is not limited to the actual honeycomb shape of the cells of the core layer as shown in FIG. 4 as the actual shape of the cells is not of significance to this invention. Other known shapes can also be provided for the cells.

FIG. 5 shows a schematic flow chart illustrating the procedure of a method according to the invention. A first step 50 of the method involves providing a draining layer in a first cover layer of a composite plate which has the first cover layer and a second cover layer, between which is arranged a core layer to be drained, wherein the core layer has a plurality of cells each preferably with a wall extending substantially transversely with respect to the core layer and at least one opening towards the first cover layer, wherein the draining layer respectively covers at least partially the opening of a cell. A further step 52 in the method involves receiving liquid from the plurality of cells through the draining layer and a third step 54 involves removing the liquid from the draining layer and the composite plate.

Besides the capability of carrying liquid away from the interior of the composite plate the draining layer also additionally has the property of preventing at least coarse dust or sand from penetrating into the composite plate or the cells through the openings in the through-passage layer and it thus also serves as a filter element.

Preferably the walls of the cells of the core layer are coated with a fire-protection lacquer and/or include a material with a fire-retardant effect. An example in that respect is a lacquer with silicon oxide nanoparticles ($SiO_2$). It is also advantageous to provide in the material of the walls, for example a phenolic resin, silicon oxide nanoparticles, which could already be introduced in particular in manufacture of the core layer.

What is claimed is:

1. A composite plate comprising:
a first cover layer;
a second cover layer; and
a core layer arranged between the first and the second cover layers and having a plurality of cells which are at least partially open towards the first cover layer and which are separated from each other by walls, characterised in that the first cover layer has a draining layer and a first through-passage layer arranged between the draining layer and the core layer, wherein the first through-passage layer is provided with openings at least partially covered by the draining layer, wherein the cells are at least partially covered by the draining layer,
wherein the draining layer is hydrophilic, and the draining layer receives and carries away liquid from the plurality of cells with capillary forces, wherein the second cover layer includes a second through-passage layer and a conductive layer, the second through-passage layer between the core layer and the conductive layer, and a discrete contact element is disposed on a side of the conductive layer opposite the second through-passage layer.

2. A composite plate according to claim 1 characterised in that the draining layer includes a liquid-draining textile.

3. A composite plate according to claim 2 characterised in that the textile is a woven textile on a polyester basis.

4. A composite plate according to claim 3, wherein the woven textile comprises polyethylene terephthalate.

5. A composite plate according to claim 2 characterised in that the textile complies with the fire-protection standards DIN 4102 Part 1/B1 and EN 1021 Part 1+2.

6. A composite plate according to claim 1 characterised in that the draining layer has a draining fringe which extends beyond the core layer.

7. A composite plate according to claim 6, wherein the draining fringe is of a shape which narrows in a direction away from the core layer.

8. A composite plate according to claim 1 characterised in that the second cover layer has a second through-passage layer with openings, wherein the plurality of the cells in addition are respectively at least partially open to the second cover layer in the region of the openings in the second through-passage layer, wherein a through-passage path is provided for a gas through the second cover layer, the core layer and the first cover layer and/or in the reverse direction.

9. A composite plate according to claim 1 characterised in that the first or second cover layer has an electrically conductive layer.

10. A composite plate according to claim 9 wherein the electrically conductive layer includes an electrically conductive fabric.

11. A composite plate according to claim 9 characterised in that the electrically conductive layer is provided with an electrically conductive contact element which projects beyond the electrically conductive layer and is contactable with an electrically conductive layer of a further composite plate.

12. A composite plate according to claim 1 characterised in that the walls of the cells of the core layer extend substantially transversely with respect to the core layer.

13. A composite plate according to claim 1, wherein a discrete draining fringe is coupled to only a part of a first surface of the draining layer, and the first surface of the draining layer is opposite a second surface of the draining layer, the second surface of the draining layer in contact with the first through-passage layer.

* * * * *